United States Patent
Becher

[11] Patent Number: 5,839,076
[45] Date of Patent: Nov. 17, 1998

[54] METHOD FOR THE TRANSMISSION OF SUBSCRIBER DATA BETWEEN NETWORK NODES IN AT LEAST ONE COMMUNICATIONS NETWORK SUPPORTING THE STRUCTURE OF AN INTELLIGENT NETWORK

[75] Inventor: Reinhard Becher, Munich, Germany

[73] Assignee: Siemens Aktiengesellschaft, Munich, Germany

[21] Appl. No.: 613,069

[22] Filed: Mar. 8, 1996

[30] Foreign Application Priority Data

Mar. 13, 1995 [DE] Germany .......... 195 09 000.4

[51] Int. Cl.$^6$ .......... H04Q 7/24
[52] U.S. Cl. .......... 455/461; 455/432; 455/433; 455/461
[58] Field of Search .......... 455/461, 433, 455/436, 435, 422, 412, 414, 432, 507; 379/207, 144, 230, 211, 212

[56] References Cited

U.S. PATENT DOCUMENTS

| | | | |
|---|---|---|---|
| 5,329,578 | 7/1994 | Brennan et al. | 455/211 |
| 5,400,390 | 3/1995 | Salin | 455/433 |
| 5,561,840 | 10/1996 | Alvesalo et al. | 455/433 |
| 5,564,072 | 10/1996 | Garci Aguilera et al. | 455/422 |
| 5,590,398 | 12/1996 | Mattews | 455/433 |
| 5,610,919 | 3/1997 | Willard et al. | 455/432 |
| 5,610,969 | 3/1997 | McHenry et al. | 455/435 |
| 5,615,267 | 3/1997 | Lin et al. | 455/433 |
| 5,621,783 | 4/1997 | Lantto et al. | 455/433 |
| 5,649,301 | 7/1997 | Yabusaki et al. | 455/433 |

OTHER PUBLICATIONS

International Telecommunication Union—ITU–T—Q.1214 (Mar. 1993).
International Telecommunication Union—ITU–T—Q.1215 (Mar. 1993).
IN–Architektur, Anrufverarbeitung und Signalisierung—tec Feb. 1994.
SIEMENS—D900 Mobile Communication System System Description SYD.

*Primary Examiner*—William Cumming
*Assistant Examiner*—Jean A. Gelin
*Attorney, Agent, or Firm*—Hill & Simpson

[57] ABSTRACT

In a method for the transmission of subscriber data between network nodes in at least one communications network supporting the structure of an intelligent network, each time a network subscriber passes from a first mobile location zone having an originating network node into a second mobile location zone having a target network node, trigger data as subscriber-related data respectively stored for the network subscriber are requested by a central network node and are transmitted to the target network node, which, in the second mobile location zone, creates a connection to a separate network node in a call processing using the data. In this way, in addition to the current subscriber data, the subscriber-related branching data can be made dynamically available at all times and to all mobile locations to the network subscriber moving arbitrarily in a communications network.

9 Claims, 1 Drawing Sheet

METHOD FOR THE TRANSMISSION OF SUBSCRIBER DATA BETWEEN NETWORK NODES IN AT LEAST ONE COMMUNICATIONS NETWORK SUPPORTING THE STRUCTURE OF AN INTELLIGENT NETWORK

BACKGROUND OF THE INVENTION

The invention concerns a method for the transmission of subscriber data between network nodes in at least one communications network supporting the structure of an intelligent network.

The network architecture of an intelligent network (IN) for the use of services in a communications network is known from the article "IN-Architektur, Anrufverarbeitung und Signalisierung," In Tec 2/94, pages 4 to 7. A typical feature of the intelligent network is the assignment of functional units to the various physical units, comprising among other things service control points (SCP) and service switching points (SSP)—see FIG. 1. Here there are also service control functions (SCF) and service switching functions (SSF), of which the service control function defines how a call is to be handled in order to implement a particular service in the network. A further functional unit represents the call control function (CCF), which is responsible for call processing during the connection set-up for the call and makes available trigger mechanisms for access to functions of the intelligent network. The basic call processing and connection functions of the call control function are specified by means of a call processing model implemented in the network node—see FIGS. 2 and 3. The call processing can be interrupted by the appearance of the trigger mechanisms, after a particular event has cut in during a call. On the basis of an event of this sort, a branching can take place to another service control point (SCP), which can call up the functions of the intelligent network, e.g. the supply of information for the use of services. The trigger event, which enables access to intelligent network functions, is designated below as a trigger detection point see page 6, end of second paragraph. The trigger detection points, the functions (CCF, SSF, SCF) and the call processing model are also disclosed in the CCITT recommendation concerning intelligent networks Q.1214, number 03/93.

An example of an application for an intelligent network function is the use of a service desired by a user. There the trigger detection point is fixedly entered into a subscriber database as a subscriber-related datum provided for the respective network subscriber wishing to use the service, in order to enable the setting up, upon the arrival of the event during the call or during the connection set-up for the call, of the signaling connection to the service control point that makes available the functions and information required for carrying out the service. Due to the static storing of the trigger detection point in the network node of the communications network, the intelligent network functions can no longer be made available to a mobile network subscriber located e.g. in another communications network, or to a network subscriber who is inscribed in another network node or another network.

The network subscribers may inscribe themselves in a communications network comprising several network nodes, such as e.g. a wire-bound fixed network or a mobile radio network, via its subscriber stations. A mobile radio network according to the GSM standard (Global System for Mobile Communication) is known, e.g. from the system specification "D900-Mobile Communication System," by Huder/Geier, Siemens AG, 1992, order number A30808-X3231-X-2-7618.

SUMMARY OF THE INVENTION

It is an object of the present invention to provide a more flexible design for the method for the transmission of subscriber data between network nodes in at least one communications network of the type described above, in a manner that avoids the static, fixed storage of the trigger detection points.

According to the method of the invention for transmission of subscriber data between network nodes and at least one communications network supporting a structure of an intelligent network, subscriber data and trigger data as subscriber-related data are stored for network subscribers in a central network node. With the subscriber-related data, a connection to a separate network node is respectively set up by means of which functions of the intelligent network are accessed. Every time a network subscriber moves from a first mobile location zone having an originating network node into a second mobile location zone having a target network node, the subscriber-related data stored for the network subscriber are automatically requested by the central network node and are transmitted to the target network node, which sets up the connection to the separate network node in a call processing using the trigger data.

By means of the automatic transmission of the subscriber-related data respectively stored for the network subscriber from the central network node to a target network node every time the network subscriber passes into a new mobile location zone, the connection to the separate network node can also be dynamically set up in the new mobile location zone on the basis of the trigger data. In this way, the trigger [subscriber-related] data stored as [ . . . ] data can be made available at any time and at any mobile location to the network subscriber roaming in one or several communications networks, alongside the individual subscriber data, which comprise service data for the use of particular services.

This is particularly advantageous if the subscriber receives the trigger data as subscriber-related data immediately and automatically each time he roams from a first communications network, containing the originating network node, into a second communications network, containing the target network node.

It is advantageous if the method according to the invention is used in a mobile radio network having mobile radio subscribers, between, on the one hand, visitor location registers used as originating network nodes and as target network nodes, and, on the other hand, a central home location register, whereby originating network nodes and target network nodes may be arranged in one and the same mobile radio network or in different mobile radio networks.

It is also advantageous if the subscriber-related data, stored for the network subscriber and automatically made available each time the subscriber roams into a new mobile location zone, contain trigger detection points, information for distinguishing the type of call, address information of the separate network node and additional control information.

DESCRIPTION OF THE PREFERRED EMBODIMENTS

Figure 1:
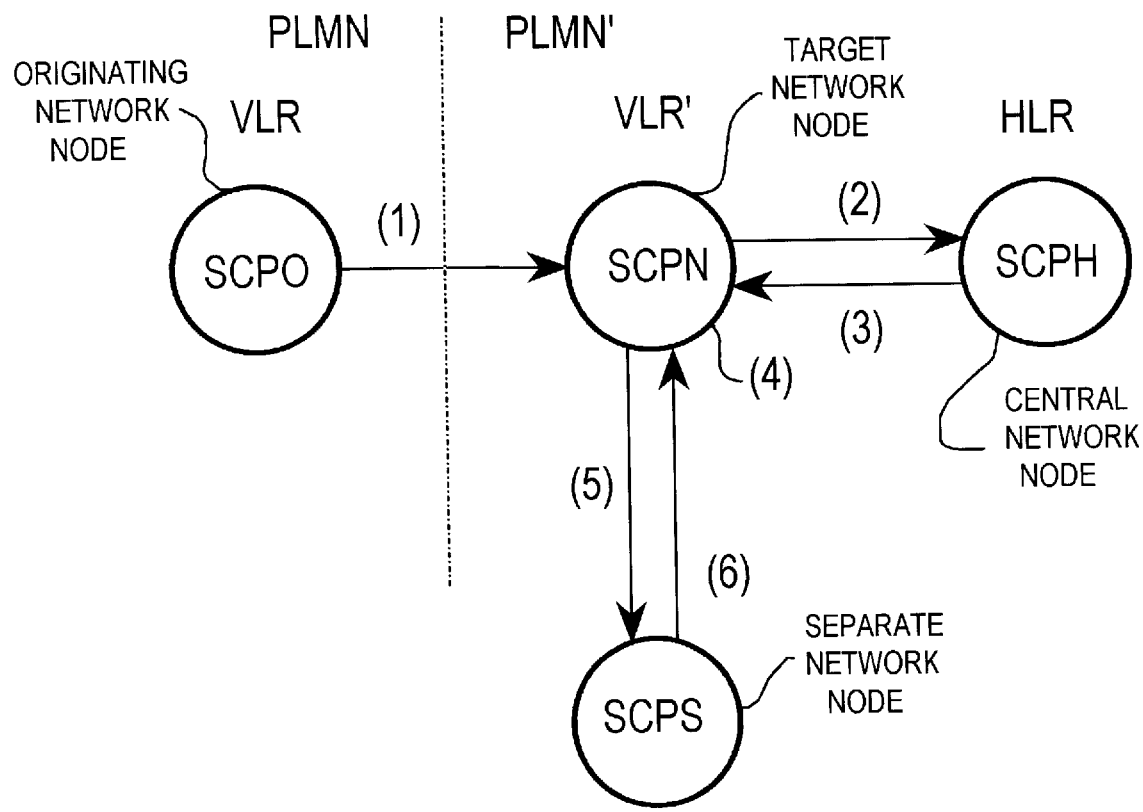
FIG. 1 shows the network nodes involved in the transmission of the subscriber data in two different mobile radio networks.

FIG. 1 shows an originating network node SCPO in a digital, cellularly designed mobile radio network PLMN and a target network node SCPN, a central network node SCPH and a separate network node SCPS in a digital, cellularly constructed mobile radio network PLMN'. The mobile radio networks PLMN, PLMN' operated according to the GSM standard support the network architecture of intelligent networks in that, among other things, the originating network node SCPO can be regarded as a visitor location register VLR, the target network node SCPN can be regarded as a visitor location register VLR' and the central network node SCPH can be regarded as a home location register HLR. The network nodes of intelligent networks thus represent service control points. In the mobile radio network PLMN at least one home location register is arranged as well, which however is not pictured since it is of no significance for the invention.

The visitor location registers VLR, VLR' and the home location register HLR thus serve for the storage of subscriber data for the mobile radio subscribers moving in the mobile radio networks PLMN, PLMN', whereby the home location register HLR, as a central subscriber database of a mobile radio network, stores the individually allocated subscriber data for all mobile radio subscribers, while in the visitor location registers VLR, VLR' the subscriber data are only temporarily deposited, said data belonging to the mobile radio subscribers currently located in a particular local mobile location zone and being served by a mobile switching station respectively fixedly allocated to the visitor location register.

The represented embodiment, for mobile radio networks having the network architecture of intelligent networks, can be used as well for fixed networks having a corresponding structure, in which the switching means comprise data registers for the storage of the subscriber-related data and the service data. The invention can also be used for the transmission of the subscriber data between a wire-bound fixed network and a wireless mobile radio network, insofar as each communications network supports the structure of an intelligent network.

For the case in which the mobile radio subscriber currently registered in the originating network node SCPO roams from a first mobile location zone (in the present case, from the mobile radio network PLMN) into a second mobile location zone (in the present case, into the mobile radio network PLMN'), an inscription of the mobile radio subscriber in the target network node SCPN takes place (1). In this way, an updating of the momentary mobile location of the moving mobile radio subscriber can be carried out in a single mobile radio network upon the subscriber's passage from a first service area, served by a first mobile switching center having an associated visitor location register, into a second service area, served by a second mobile switching center having an associated visitor location register. The inscription is known for GSM mobile radio networks under the name "location update", and is specified in the system specification "D900 . . . " cited above, in section 8.1 on pages 61ff.

According to the invention, during the inscription (1) of the mobile radio subscriber in the target network node SCPN, a profile created for the mobile radio subscriber, containing subscriber-related service data (service profile) and subscriber-related trigger data (trigger profile), is requested by the central network node SCPH (2). The subscriber-related trigger data are transmitted, together with the subscriber-related service data, by the central network node SCPH to the requesting target network node SCPN (3), which monitors the incoming trigger data to see whether information for the set-up of a connection to the separate network node is present or not (4). For this case, the trigger data contain one or several pieces of trigger information— the "trigger detection points"—upon arrival of which a connection to the separate network node SCPS is built in the connection set-up (5), in order to transmit information for the further call processing back to the target network node SCPN (6).

In this way, it is possible to feed back automatically to the mobile radio subscribers their individual subscriber-related trigger data, independent of their mobile location, upon their inscription into a new mobile location zone, so that at any time and at any mobile location of the mobile radio subscriber in his mobile radio network or in another one, a connection can be set up from the target network node to the separate network node. By this, the range of services set up for a mobile radio subscriber in an originating mobile radio network can, for example, continue to be used by the subscriber upon his passage into a target mobile radio zone, if the connection to be set up to the separate network node exists, and which is recognizable in the called-up trigger data for the moving network subscriber.

Figure 2:
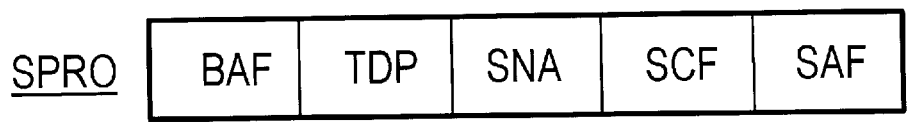
FIG. 2 shows the information which is transmitted to the target network node.

FIG. 2 shows the profile data SPRO transmitted between the target network node and the originating network node in order to set up the connection to the separate network node. For this purpose the data consist of base information BAF, by means of which distinctions are made between trigger data for originating calls and terminating calls and for short messages (short message service). Trigger detection points TDP identify the call-related trigger profile in a manner dependent on the services defined for and called by the subscriber. Using address information SNA, consisting for example of a particular calling number, the separate network node can be chosen in the context of the connection set-up. Control information SCF and SAF indicate whether the service called by the network subscriber can be controlled only by the network operator of the communications network, or also by the subscriber himself, and whether this service is activated or not. The control information SAF is then available only if the control information SCF can also be called by the network subscriber.

During connection set-up for terminating and originating calls, a connection to the separate network node, which node supplies the required information, is thus set up with reference to the trigger data for the respective subscriber. If necessary, the separate network node can also request the target network node to create a connection to the separate network node, in particular in the case in which the target network node is located in a different communications network than the originating network node. Then it is also ensured in this case that the services available to and called by the mobile radio subscriber in the originating mobile location zone can be used in the new mobile location zone as well. Some of the trigger information TDP contained in the profile data SPRO is, for example, indicated in the cited CCITT recommendation Q.1214. The transmission of the subscriber data between the individual network nodes occurs using transmission protocols which are dependent on the presence of a wire-bound fixed network or of a wireless mobile radio network, and are dependent on whether a roaming occurs within a single mobile radio network or fixed network, or between two different networks.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for transmission of subscriber data between network nodes in at least one communication network supporting a structure of an intelligent network, comprising the steps of:

storing subscriber-related service data and subscriber-related trigger data for network subscribers in a central network node; and every time a network subscriber roams from a first mobile location zone having an originating network node into a second mobile location zone having a target network node, automatically requesting by the central network node the subscriber-related service data and trigger data stored for the network subscriber and transmitting the subscriber-related service data and trigger data to the target network node which sets up a connection to a separate network node in a call processing using the subscriber-related trigger data in order to transmit information for further call processing back to the target network node.

2. A method according to claim 1 including the step of providing the first mobile location zone having the originating network node and a second mobile location zone having the target network node in one communications network.

3. A method according to claim 1 including the step of providing the first mobile location zone having the originating network node and the second mobile location zone having the target network node in different communications networks.

4. A method according to claim 1 including the step of providing the communications network as a wire-bound fixed network.

5. A method according to claim 1 including the step of providing the communications network as a mobile radio network.

6. A method according to claim 5 wherein the originating network node and the target network node respectively form a visitor location register of the mobile radio network, and the central network node forms a home location register of the mobile radio network.

7. A method according to claim 1 wherein the subscriber-related data contains base information for distinguishing originating calls and terminating calls, trigger detection points, and at least one address information for selection of the separate network node.

8. A method according to claim 7 wherein the subscriber-related data contain additional control information that indicate whether the trigger information are controlled by the network subscriber himself or by a network operator of the communications network, or respectively whether the trigger information are activated.

9. A method for transmission of subscriber data between network nodes in mobile radio net works, comprising the steps of:

storing subscriber-related service data and subscriber-related trigger data for network subscribers in a central network node;

when a network subscriber roams from a first mobile location zone in a first mobile radio network having an originating network node into a second mobile location zone of a second mobile radio net work having a target network node, automatically requesting by the central network node a subscriber-related service data and trigger data stored for the network subscriber and transmitting the subscriber-related service data and trigger data to the target network node which sets up a connection to a separate network node in a call processing using the subscriber-related trigger data in order to transmit information for further call processing back to the target network node, and wherein the trigger data contains one or more pieces of trigger information known as trigger detection points which identify a call-related trigger profile in a manner dependent on services defined for and called by the network subscriber.

\* \* \* \* \*